United States Patent [19]
Levy et al.

[11] Patent Number: 5,659,725
[45] Date of Patent: Aug. 19, 1997

[54] QUERY OPTIMIZATION BY PREDICATE MOVE-AROUND

[75] Inventors: Alon Yitzchak Levy, New Providence; Inderpal Singh Mumick, Berkeley Heights, both of N.J.

[73] Assignee: Lucent Technologies Inc., Murray Hill, N.J.

[21] Appl. No.: 254,215

[22] Filed: Jun. 6, 1994

[51] Int. Cl.$^6$ ........................................ G06F 17/30
[52] U.S. Cl. .................................. 395/600; 364/DIG. 1; 364/282.1; 395/504; 395/605
[58] Field of Search ............................ 395/600, 700, 395/66

[56] References Cited

U.S. PATENT DOCUMENTS

| 5,307,445 | 4/1994 | Dalal et al. | 395/66 |
| 5,367,675 | 11/1994 | Cheng et al. | 395/600 |
| 5,412,804 | 5/1995 | Krishna | 395/600 |

OTHER PUBLICATIONS

Hwee Hwa Pang et al., "An Efficent Semantic Query Optimization Afgorithm," 7th Int'l Conf. on Data Engineering, 1991 pp. 326–335.
A. Y. Levy, I. S. Mumic, Y. Sagiv, O. Shmueli, "Equivalence, Query-Reachability, and Satisfiability in Datalog Extensions", ACM SIGACT-SIGMOD-SIGART *Symposium on Principles of Database Systems*, 1993.
S. Sudarshan, R. Ramakrishnan, "Aggregation and Relevance in Deductive Databases", *International Conference on Very Large Data Bases*, 1991.
A. Levy, Y. Sagiv, "Constraints and Redundancy in Datalog", ACM SIGACT-SIGMOD-SIGART *Symposium on Principles of Database Systems*, 1992.
J. D. Ullman, *Principles of Database and Knowledge-Base Systems, vol. 2, Computer Science Press*, 1989.
I. S. Mumick, H. Pirahesh, "Implementation of Magic-sets in a Relational Database System", 1994 ACM SIGMOD *International Conference on Management of Data*, Minneapolis, MN, USA, Jun. 1994, vol. 23, No. 2, ISSN 0163-5808, pp. 103–114.
J. M. Hellerstein, "Practical Predicate Placement", 1994 ACM SIGMOD *International Conference on Management of Data, Minneapolis*, MN, USA, Jun. 1994, vol. 23, No. 2, ISSN 0163-5808, pp. 325–335.
S. Talbot, "An Investigation into Logical Optimization of Relational Query Languages", *The Computer Journal*, vol. 27, No. 4, 1984, pp. 301–309.
X. Wang, B. Shi, "Query Optimization in a Knowledge Base System", *Future Databases'92, Proceedings of the Second Far-East Workshop on Future Database Systems*, Kyoto, Japan, 26–28 Apr. 1992, pp. 327–330.

*Primary Examiner*—Paul V. Kulik

[57] ABSTRACT

Query optimization which is done by making a graph of the query and moving predicates around in the graph so that they will be applied early in the optimized query generated from the graph. Predicates are first propagated up from child nodes of the graph to parent nodes and then down into different child nodes. After the predicates have been moved, redundant predicates are detected and removed. Predicates are moved through aggregation operations and new predicates are deduced from aggregation operations and from functional dependencies. The optimization is not dependent on join order and works where nodes of the graph cannot be merged.

17 Claims, 5 Drawing Sheets

FIG. 1

```
calls(FromAC, FromTel, ToAC, ToTel, AccessCode, StartTime, Length)
customers(AC, Tel, OwnerName, Type, MemLevel)
users(AC, Tel, UserName, AccessCode)                                    } 701
secret(AC, Tel)
promotion(AC, SponsorName, StartingDate, EndingDate)
```

(E1):   CREATE VIEW fgAccounts(AC, Tel, UserName) AS      ⟵ 111
            SELECT DISTINCT c.AC, c.Tel, u.UserName
            FROM customers c, users u
            WHERE c.AC = u.AC AND                          ⟵ 109        } 103
                c.Tel = u.Tel AND
                c.Type = "Govt" AND
                c.AC = "011" AND
                NOT EXISTS (SELECT * FROM secret s
                            WHERE s.AC = c.AC AND s.Tel = c.Tel)

(F1):   CREATE VIEW ptCustomers (AC, Tel, OwnerName, ToAC, MaxLen) AS
            SELECT c.AC, c.Tel, c.OwnerName, t.ToAC, MAX (t.Length)
            FROM customers c, calls t
            WHERE t.Length > 2 AND
                t.FromAC <> t.ToAC AND        111         109           } 105
                c.AC = t.FromAC AND
                c.Tel = t.FromTel AND
                c.MemLevel = "Silver"
            GROUPBY c.AC, c.Tel, c.OwnerName, t.ToAC 109
(Q1):   SELECT ptc.AC, ptc.Tel, fg.UserName, p.SponsorName
            FROM ptCustomers ptc, fgAccounts fg, promotion p
            WHERE ptc.AC = fg.AC AND                                     } 107
                ptc.Tel = fg.Tel AND
                ptc.MaxLen > 50 AND
                p.AC = ptc.ToAC /* <> is the SQL symbol for *not equal* */

($E1_o$):  CREATE VIEW fgAccounts$_o$(AC, Tel, UserName) AS
　　　　SELECT DISTINCT c.AC, c.Tel, u.UserName
　　　　FROM customers c, users u
　　　　WHERE c.AC = u.AC AND
　　　　　　c.Tel = u.Tel AND
　　　　　　c.Type = "Govt" AND
　　　　　　c.MemLevel = "Silver" AND
　　　　　　c.AC = "011" AND
　　　　　　NOT EXISTS (SELECT * FROM secret s
　　　　　　　　　WHERE s.AC = c.AC AND s.Tel = c.Tel)  } 203

($F1_o$):  CREATE VIEW ptCustomers$_o$ (AC, Tel, OwnerName, ToAC, MaxLen) AS
　　　　SELECT c.AC, c.Tel, c.OwnerName, t.ToAC, MAX (t.Length)
　　　　FROM customers c, calls t
　　　　WHERE t.Length > 50 AND
　　　　　　t.ToAC <> "011" AND
　　　　　　t.FromAC = "011" AND
　　　　　　c.Tel = t.FromTel AND
　　　　　　c.MemLevel = "Silver" AND
　　　　　　c.Type = "Govt" AND
　　　　　　c.AC = "011" AND
　　　　　　NOT EXISTS (SELECT * FROM secret s
　　　　　　　　　WHERE s.AC = c.AC AND s.Tel = c.Tel)
　　　　GROUPBY c.AC, c.Tel, c.OwnerName, t.ToAC  } 205

($Q1_o$):  SELECT ptc.AC, ptc.Tel, fg.UserName, p.SponsorName
　　　　FROM ptCustomers$_o$ ptc, fgAccounts$_o$ fg, promotion p
　　　　WHERE ptc.AC = fg.AC AND
　　　　　　ptc.Tel = fg.Tel AND
　　　　　　p.AC = ptc.ToAC  } 207

```
CREATE VIEW V (A1, ..., Al)
   SELECT r.B, s.C, Max(r.D)
   FROM R r, S s
   WHERE   r.B ≤ r.C
           s.C=r.A
   GROUPBY r.A
   HAVING ...
```

Figure 3: GROUPBY node triplets.

```
CREATE VIEW V (A1, ..., Al)
    SELECT ...
    FROM ...
    WHERE ...                    401
    UNION
        :
    UNION
    SELECT ...        403
    FROM ...
    WHERE ...
```

405(0)            405(n)

...

FIG. 7 calls(FromAC, FromTel, ToAC, ToTel, AccessCode, StartTime, Length) 703
customers(AC, Tel, OwnerName, Type, MemLevel) 705
users(AC, Tel, UserName, AccessCode) 707
secret(AC, Tel) 709
promotion(AC, SponsorName, StartingDate, EndingDate) 711

QUERY OPTIMIZATION BY PREDICATE MOVE-AROUND

1 BACKGROUND OF THE INVENTION +ps 1.1 Field of the Invention

The invention concerns techniques for constraint propagation generally and more particularly concerns techniques for optimizing queries by moving constraints so that they are applied as early as possible in a computation.

1.2 Description of the Prior Art

Data base systems have long been used to store and access large quantities of data. The data in the data base is organized in some fashion and queries made by users of the data base system take advantage of the organization of the data base to return portions of the data which are useful to the user. Many modern data base systems are relational data base systems. In such systems, the data is organized into a set of relations. Each relation is a table which has columns and rows. The columns define classes of data (for example, employee name, employee department, and pay), while the rows contain related values of the data. Thus, a us_employee relation might have a row for each employee in the U.S. and columns for employee name, employee department, and employee pay. The specific values in a row for employee department and employee pay are the ones for the employee specified by the employee name. There are two kinds of relations in the data base system: base relations in which the data values are actually stored in the data base system, and views, that is, relations which are not stored, but which are constructed on the fly from data in the base relations.

The queries in relational data base systems define the data they wish to return in terms of relations and constraints on the relations which limit what data the query returns from the relation. For example, a query on the us_employee relation might request a list of the names of all U.S. employees whose pay was greater than $100,000 per year. The requirement that the employees on the list be paid more than $100,000 is of course a constraint.

Most relational data base systems use a language called SQL for their queries. A query in SQL for the above example would look like this:

SELECT name, pay
FROM us_employees
WHERE pay>100,000.

In such a query, the field names of a relation are termed attributes of the relation. Thus, in the above example, the relation us_employees has the attributes name, pay, and dept. A constraint which applies to an attribute, for example, the constraint that us_employees.pay>100,000 is termed a predicate which is applicable to the attribute, in this case, the attribute pay.

Since many data bases are very large, efficiency is an important aspect of the design of data base systems. One aspect of efficiency is query optimization, which puts the computations needed to execute a query into a form which minimizes the amount of time and/or memory resources required. An important part of query optimization is optimizing the application of constraints. Two techniques for optimizing constraints are minimizing the number of constraints and applying them as early as possible.

For instance, if we expand the previous example to include another relation, world_employees, in which the rows have the same attributes as the rows in us_employees and apply our query to both relations, we get:

SELECT name, pay
FROM us_employees, world_employees
WHERE pay>100,000

There are two ways of computing this query: one way is to assemble all of the rows from both relations and then apply the predicate pay>100,000; the other is to apply the predicate in each relation and only assemble the rows from each relation which satisfy the predicate. Clearly, the second way saves the time required to copy the rows which do not satisfy the predicate and the space required to store all of the rows from both relations, and is consequently more efficient. The second way is thus an optimization. In this case, the optimization is achieved by applying the predicate in each relation, so that it is applied as early as possible in the computation.

A number of techniques are known for applying predicates as early as possible. These techniques are commonly termed predicate pushdown techniques. The techniques are applied to a query graph, a data structure which represents the query during optimization. In the query graph for a query, each of the query's subqueries and views forms a block of the graph: One of the techniques is merging query blocks, as explained in H. Pirahesh, J. Hellerstein, and W. Hasan, "Extensible/rule based query rewrite optimization in starburst", in SIGMOD 1992, pp. 39–48. This technique is limited by the fact that query blocks often cannot be merged. Another of the techniques is pushing predicates down the query graph, into query blocks that are computed earlier during evaluation. This technique works only on hierarchical queries, that is, queries which are nonrecursive and do not have common subexpressions. See J. Ullman, *Principles of Database and Knowledgebase Systems*, vol. 1 and 2, Computer Science Press, 1989. A third technique is based on the magic set transformation, explained in the Ullman text. The third technique permits a predicate to be moved up from a relation and down into another relation when the other relation appears later in the join order, as explained in detail in I. Mumick, S. Finkelstein, H. Pirahesh, and R. Ramakrishnan, "Magic Conditions", in PODS 1990.

What is needed, and what is provided by the present invention, is an optimization technique which permits predicates generally to be moved around a query tree to the node where their application is most efficient and applying them in that node.

2 SUMMARY OF THE INVENTION

The optimization technique is a generalization of the predicate-pushdown technique, called predicate move-around, which first moves predicates into other nodes of the query graph and then reduces the number of the propagated predicates. As a result, each predicate is applied at an advantageous point in the computation of the query. In a preferred embodiment, the predicates are moved by propagating them up the query graph and then down the query graph and the reduction removes redundant predicates. At the end of the reduction, the remaining predicates are applied as early as possible in the computation.

Predicate move-around can be applied even if, some blocks have aggregates and even if duplicates are retained in some blocks and eliminated in others. Our algorithm for predicate move-around is extensible in the sense that (1) a variety of predicates can be moved around; for example, comparison and inequality predicates, EXISTS and NOT EXISTS predicates, negated base relations (the EXCEPT clause), arithmetic predicates (e.g., X=Y+Z), the LIKE predicate, functional dependencies and more, and (2) Predicates can be moved through new operators like outer-join. The predicate move-around results in applying a larger number of predicates to base and intermediate relations and doing so as early as possible; hence, the evaluation becomes much more efficient. Unlike the magic-set transformation, predicate move-around does not need auxiliary relations (such as the magic and supplementary relations) and does not depend upon the order of doing joins. Our move-around algorithm applies to nonrecursive SQL queries, including SQL queries with correlations. It can also be generalized to recursive SQL queries.

Our technique includes the following novel features:

Moving predicates up, down and sideways in the query graph, across query blocks that cannot be merged.

Moving predicates through aggregation; in the process, new predicates are deduced from aggregation.

Using functional dependencies to deduce and move predicates.

Moving EXISTS and NOT EXISTS predicates. The EXCEPT clause can also lead to a NOT EXISTS predicates that can then be moved.

Removing redundant predicates. This is important, since redundant predicates can lead to incorrect selectivity estimates that may result in access paths and join methods that are far from optimal. Moreover, redundant predicates represent wasted computation. Our technique can be easily combined with existing query optimizers, since it works by rewriting the original queries and views.

Other objects and advantages of the apparatus and methods disclosed herein will be apparent to those of ordinary skill in the art upon perusal of the following Drawing and Detailed Description, wherein:

Reference numbers in the Drawing have two parts: the two least-significant digits are the number of an item in a figure; the remaining digits are the number of the figure in which the item first appears. Thus, an item with the reference number 201 first appears in FIG. 2.

4 DETAILED DESCRIPTION OF A PREFERRED EMBODIMENT

The Detailed Description is organized as follows. Section 4.1 illustrates the savings achieved by predicate move-around via a detailed example. Section 4.2 describes the SQL syntax and the query-tree representation on which the algorithm operates. The query tree is a straightforward parse tree representation of a query, close to what is used in several systems (e.g., H. Pirahesh, J. Hellerstein, and W. Hasan. "Extensible/rule based query rewrite optimization in starburst", in SIGMOD 1992, pages 39–48). The predicate move-around algorithm is detailed in Section 5. We describe the general algorithm, and illustrate each step of the algorithm on the example of Section 4.1.

4.1 ILLUSTRATIVE EXAMPLE

We consider a detailed example that illustrates the benefits of the predicate move-around optimization. In particular, this example illustrates how predicates can be moved across query blocks, through aggregation and using knowledge about functional dependencies.

Figure 7:
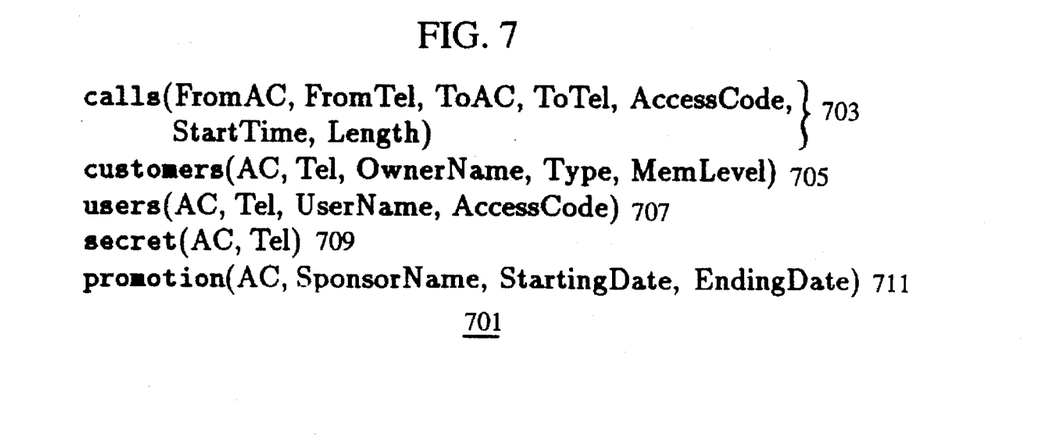
FIG. 7 shows the base relations used in the example.

This example is representative of the complexities to be found in real world decision-support queries. Further, it illustrates our alogorithm's increased ability to deal with complex queries. The example uses the base relations from a telephone database shown in FIG. 7. calls relation 703 has a tuple (row) for every call made. A telephone number is represented by the area code (AC) and the local telephone number (Tel). Foreign numbers are given the area code "011." A call tuple contains the telephone number from which the call is placed, the telephone number to which the call is placed, and the access code used to place the call (0 if an access code is not used). The starting time of the call, with a granularity of 1 minute, and the length of the call, again with 1 minute granularity, are included. Due to the time granularity and multiple lines having the same phone number, duplicates are permitted in this relation. In particular, there can be several calls of 1 minute each starting within the same 1 minute, and there can be multiple calls running concurrently between two given numbers.

customers relation 705 gives information about the owner of each telephone number. The information about owners consists of the owner's name, his account type (Government, Business, or Personal), and his membership level (Basic, Silver, or Gold). The key (i.e., the attribute values used to access the row) of the customers relation is {AC, Tel} and, so, the following functional dependency holds:

{AC, Tel}→{OwnerName, Type, MereLevel}.

That is, given AC and Tel, the system can retrieve the values of the other attributes.

A telephone number can have one or more users that are listed in users relation 707. Each user of a telephone number may have an access code. One user may have multiple access codes, and one access code may be given to multiple people. There are no duplicates in the users relation.

A few telephone numbers have been declared secret, as given by secret relation 709.

promotion relation 711 has, for each planned marketing promotion, the name of the sponsoring organization, the area codes to which calls are being promoted, and the starting and ending dates of the promotion. Note that there may be several tuples with the same area code and same sponsor, but with different dates.

Figure 1:
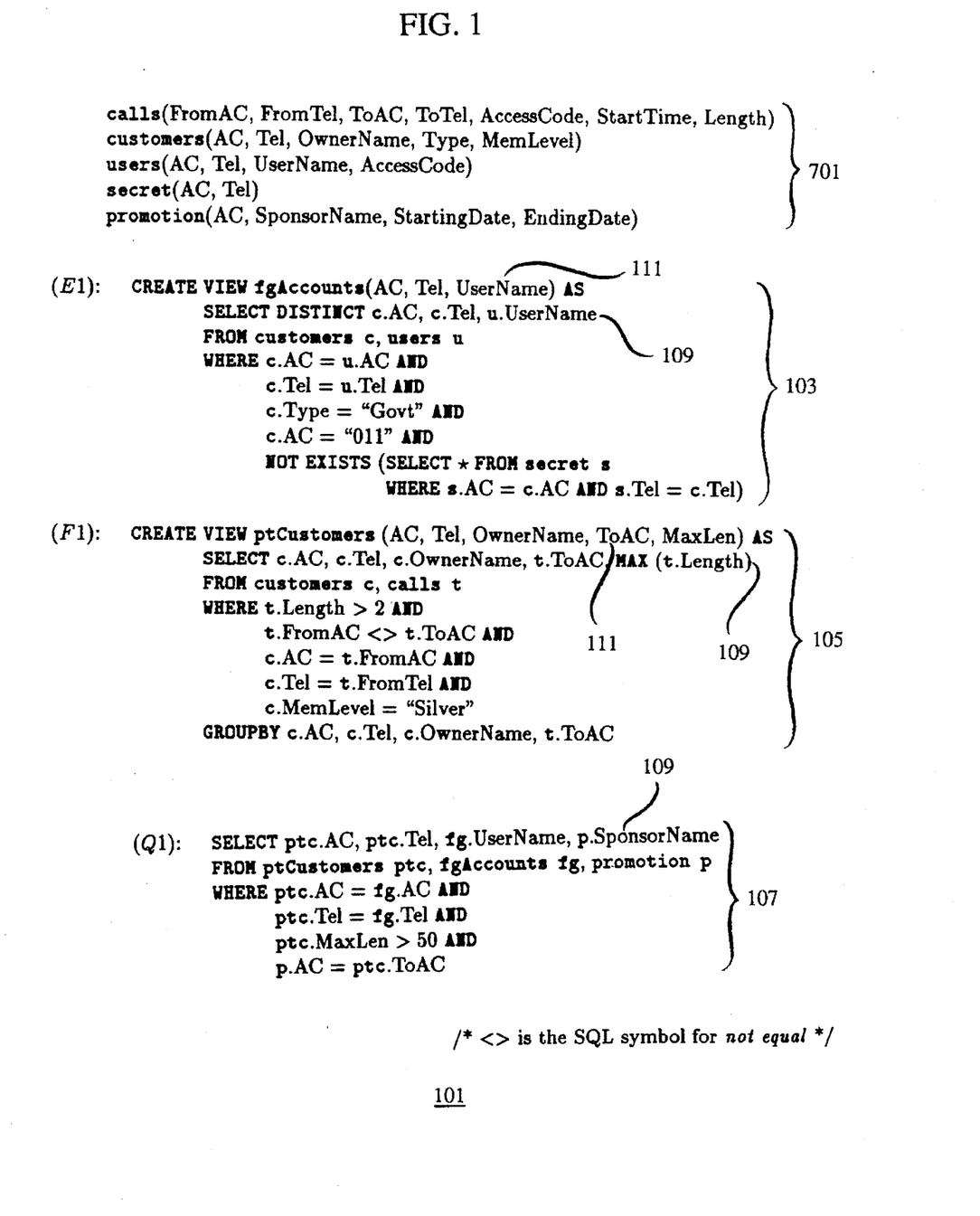
FIG. 1 is a set of example relations and views.

Example 4.1 In the following, a query Q1 will be optimized by moving predicates around. FIG. 1 shows query Q1 107 and the relations which define it. The base relations 701 are those of FIG. 7. Those relations are then used to define two views. View fgAccounts 103, denoted as E1, lists all foreign accounts (i.e., Area-Code="011") of type "Govt" that are not secret accounts. View 103 includes telephone numbers and names of users of those numbers.

The second view ptCustomers 107 (i.e., potential customers), denoted as F1, first selects calls longer than 2 minutes and then finds, for each customer with a silver level membership, the maximum length amongst all his calls to each area code other than the customer's own area code.

Query Q1 107 is then defined in terms of fgAccounts 103 and ptCustomers 107. Query 107 has been posed by a marketing agency looking for potential customers among foreign governments that make calls longer than 50 minutes to area codes in which some promotion is planned. The query lists the phone number of each relevant foreign government, the names of all users of that phone and the names of the sponsors of the relevant promotions. Note that duplicates are retained, since sponsors may have one or more promotions in one or more area codes.

Ordinary query optimizers cannot deal effectively with query Q1 107 because neither view E1 103 nor view F1 107 can be merged into the query block of Q1 107. One reason for this is that view ptCustomers 105 does aggregation, that is, it provides one or more results whose computation involves more than one tuple of the relation. In ptCustomers, the aggregation operation, is specified by GROUPBY. Another reason why the views cannot be merged is that the view fgAccounts 103 generates and eliminates duplicates (while Q1 107 retains duplicates).

Since no merger is possible, an ordinary optimizer is forced to optimize and evaluate each view separately and then optimize and evaluate the query. In particular, such an optimizer cannot push the predicate MaxLen>50 of Q1 107 from the definition of Q1 into the definition of the view ptCustomers 105 (since that predicate is over a field that is aggregated in ptCustomers). Thus, when evaluating the view ptCustomers 105, we can only use the predicate Length>2; later, when evaluating query Q1 105, we can use the predicate MaxLen>50 to discard those ptCustomers tuples that do not satisfy this selection.

Our optimization algorithm, in comparison, will do much better, since it is capable of the following:

Taking the predicate c.AC="011" of the view fgAccounts 103 and moving it into the view ptCustomers 105. As a result, the join predicate c.AC=t.FromAC is replaced with t.FromAC="011" and t.ToAC<>t.FromAC is replaced with t.FromAC<>"011".

Taking the predicate c.Type="Govt" from the view fgAccounts 103 and moving it into the view ptCustomers 105, where it is applied to customers relation 705. Note that determining the soundness of this move requires that we reason with knowledge about functional dependencies (explained in detail later). Specifically, in query Q1 107, the views fgAccounts 103 and ptCustomers 105 are joined on a key of the customers relation and, therefore, the predicate c.Type="Govt" can be moved from fgAccounts into the definition of ptCustomers.

Taking the predicate

```
NOT EXISTS (SELECT * FROM secret s
            WHERE s.AC = c.FromAC AND
                  s.Tel = c.FromTel)
``` from the view fgAccounts and moving it into the view ptCustomers. This leads to a more efficient evaluation of the view ptCustomers, since the customers relation can be restricted before taking the join with calls and before the grouping operation.

Taking the predicate c.MemLevel="Silver" from the view ptCustomers and moving it into the view fgAccounts. Again, functional dependencies are used for this move.

Taking the predicate MaxLen>50 from the query and inferring that t.Length>50 can be introduced in the WHERE clause of ptCustomers.

As a result, the predicate t.Length>2 can be eliminated from the definition of ptCustomers and the predicate t.Length>50 can be deleted from the query. Note that this optimization amounts to pushing a selection through aggregation, a novel feature of our algorithm.

Figure 2:
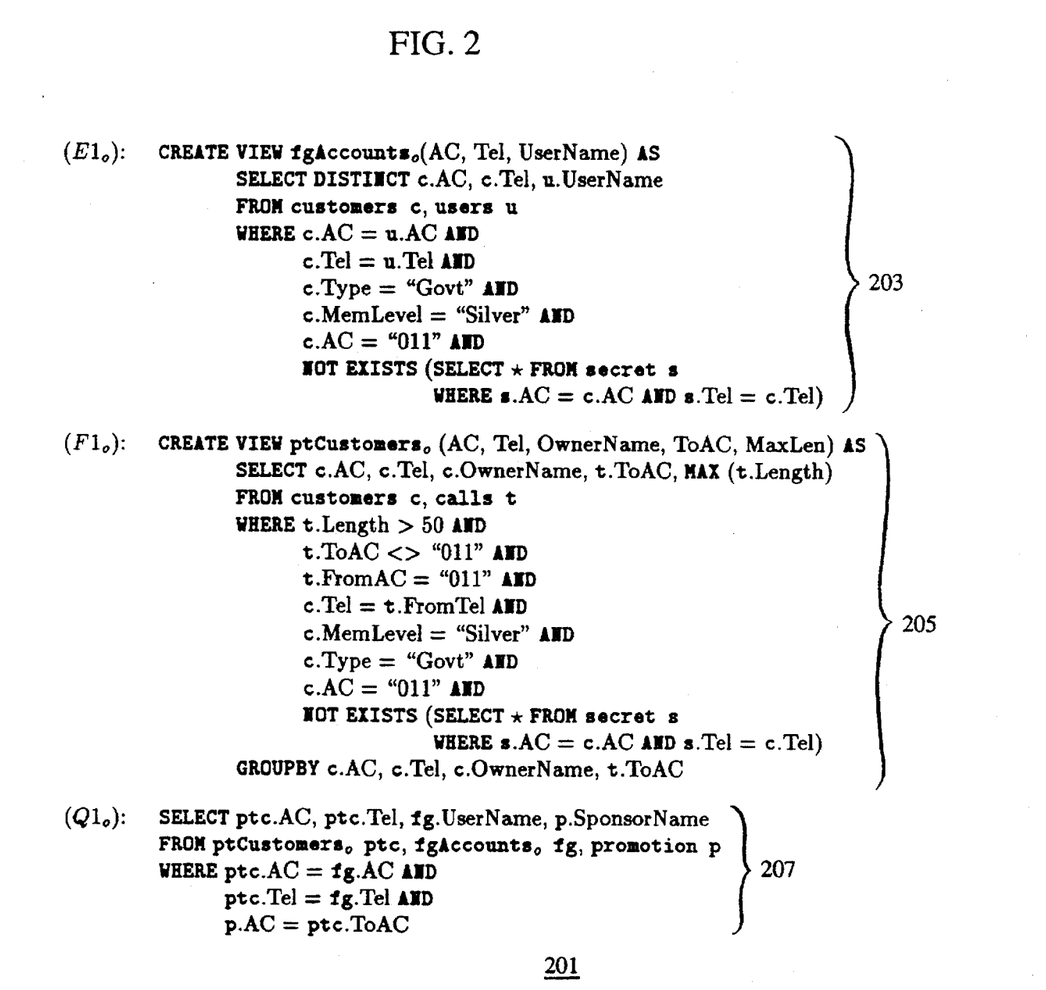
FIG. 2 is an optimized version of the relations and views of FIG. 1.

The optimized views and query are denoted in FIG. 2 as, $E1_o$ 203, $F1_o$ 205, and $Q1_o$ 207. Section 5 explains the behavior of the move-around algorithm on this example in detail.

4.2 Preliminaries: SQL Notation and the Query-Tree Representation

Figure 5:
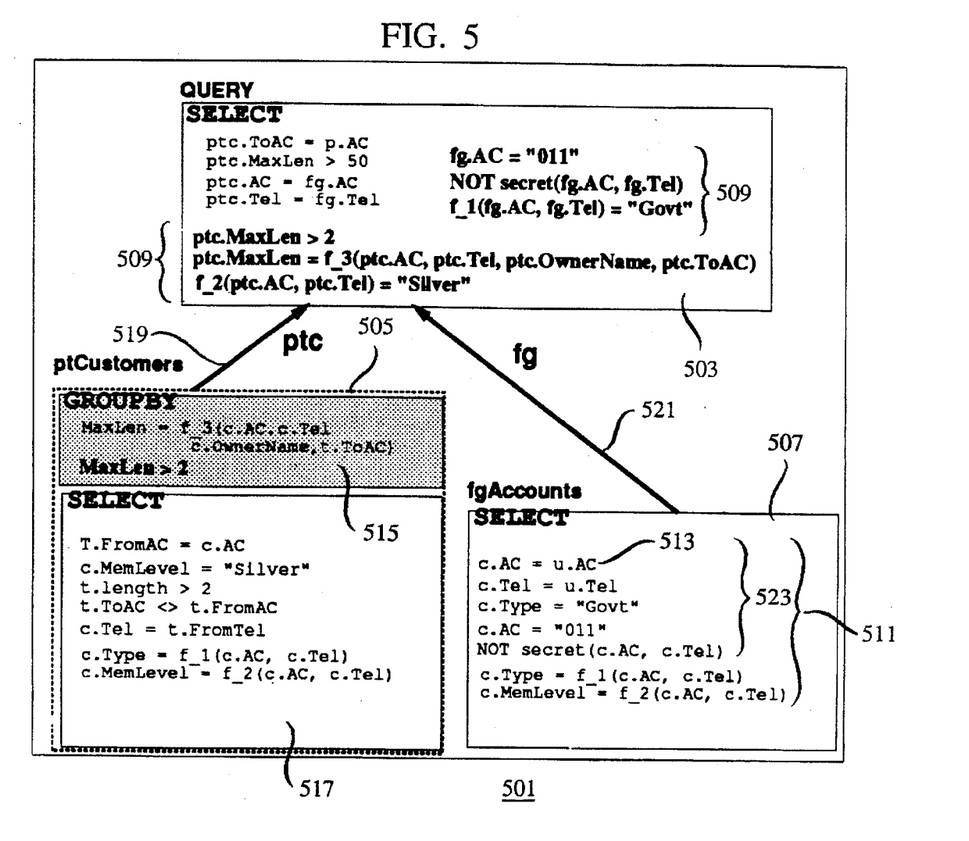
FIG. 5 is an example of a query tree during optimization.

The predicate move-around algorithm works on a query-tree representation of the SQL query. A query tree is essentially a parse tree of the query. The query tree for the example of FIG. 1 is shown in FIG. 5 and will be discussed in detail later. In this section we briefly describe the SQL syntax and explain how to build the query tree.

4.3 SQL Syntax

An SQL query can be viewed as a sequence of view definitions, one of which is designated as the query view. A view definition can be a single SELECT statement, of the form (V): CREATE VIEW...AS
SELECT...
FROM...
WHERE...
GROUPBY...
HAVING...

where the GROUPBY and HAVING clauses are optional. Alternatively, a view may be defined as a UNION, INTERSECTION, and EXCEPT of multiple SELECT statements.

4.3.1 The Query Tree

Each node of a query tree corresponds to a step in the evaluation of an SQL query. A step is the computation of either a SELECT block (i.e., a SELECT-FROM-WHERE clause), a GROUPBY block (i.e., a SELECT block combined with GROUPBY and HAVING clauses), The root of the tree is the query view. The children of a node n are the views (i.e., non-base relation) referenced in the computation of n. For example, a node for a SELECT block has a child for every view referenced in the FROM clause of that block.

Local and Exported Attributes: Each computation step has some operands and a result. The local attributes of a node are those appearing in the operands; in example 101, local attributes are given the reference number 109. The exported attributes are those appearing in the result; in example 101, they have the reference number 111. Note that the exported attributes of a node n are some of the local attributes of the parent of n. Also note that root 503 of tree 501 (i.e., the node for the query view) does not have exported attributes.

Labels: In tree 501, each node n has an associated label 511 that eventually contains all the predicates 513 applicable to local and exported attributes of n. Due to functional dependencies, labels may also contain functional terms. An example of such a functional term in label 511 of FIG. 5 is c.Type=f__1(c.Ac,c.Tel), where the value of c.Type is returned by the functional term f__1(c.Ac,c.Tel).

4.4 Kinds of Nodes in a Query Tree

The query tree 501 of a preferred embodiment may be up of four kinds of nodes: SELECT nodes, GROUPBY nodes, UNION nodes, and INTERSECTION nodes.

SELECT Nodes

When a view definition consists of a single SELECT block (i.e., a SELECT-FROM-WHERE clause) of the form CREATE VIEW V($A_1, \ldots, A_l$)AS SELECT $r_1.B_1, \ldots, r_1.B_1$
FROM $\text{Rel}_1 r_1, \ldots, \text{Rel}_m r_m$
WHERE ...

we create a SELECT node n. In query tree 501, there are three SELECT nodes: 507, 517, and 503. The local attributes of a SELECT node n are all the attributes used in its computation, i.e. terms of the form $r_i.B$, where $1 \leq i \leq m$ and B is an attribute of $\text{Rel}_i$. For example, in SELECT node 507, the local attributes are c.AC, C.Tel, C.Type, u.AC, and u.Tel.

The exported attributes are $V.A_1, \ldots, V.A_1$, or in the case of node 507, AC, Tel, UserName. Note that the exported attributes are just aliases of the local attributes listed in the SELECT clause. If $Rel_i$ is also a view, then n has a child node for the definition of $Rel_i$. A SELECT DISTINCT block is treated in exactly the same way as a SELECT block. (The difference between SELECT and SELECT DISTINCT is that in SELECT DISTINCT, duplicates are not selected.)

GROUPBY Triplets and Nodes

Figure 3:
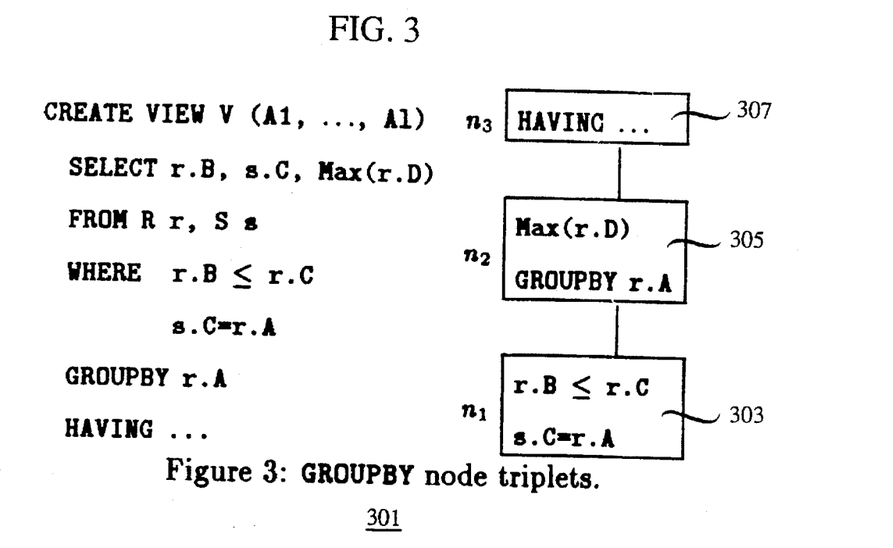
FIG. 3 shows subnodes in a GROUPBY node.

A view definition consisting of a GROUPBY block may be dealt with in the present discussion as if it were separated into three nodes. GROUPBY triplet 301 is shown in FIG. 3. The bottom node, $n_1$ 303, is a SELECT node for the SELECT-FROM-WHERE part of the view definition (it may have children as described above for SELECT nodes). The middle node, $n_2$ 305, is a GROUPBY node and it stands for the GROUPBY clause and the associated aggregations. The top node, $n_3$ 307, is a HAVING node and it stands for the predicates in the HAVING clause.

Let L denote the set of local attributes in $n_1$ 303 (defined as for an ordinary SELECT node) and let A denote the set of aggregate terms (e.g., Max(r.D)) from the SELECT clause. In both $n_1$ 303 and $n_3$ 307, L is the set of local attributes, while $L \cup A$ is the set of local attributes in $n_3$. The set of exported attributes in $n_1$ 305 is L, in $n_2$ it is $L \cup A$ and in $n_3$ it is $\{V.A_1, \ldots, V.A_1\}$. Thus, in FIG. 5, where node 505 consists of a SELECT node 517 and a GROUPBY node 515, the local and exported attributes of node 517 and the local attributes of node $n_2$ are t.Length, t.ToAC, t.FromAc, tc.Tel, c.MemLevel, c.Type, c.AC, s.Tel, and s.AC. The exported attributes of node 515 are c.AC, c.Tel, c.ownerName, t.ToAC, and MAX (t.length).

A view definition may have aggregation in the SELECT clause even without having GROUPBY and HAVING clauses. In this case, it should be considered as having an empty GROUPBY clause. Also note that if there is only a GROUPBY clause (and no HAVING clause), then we can omit the top node $n_3$ 307, as in query tree 501, and let $V.A_1, \ldots, V.A_l$ be the exported attributes of $n_2$ 805; in this case, the attributes of A are considered local in $n_2$ 305.

UNION and INTERSECTION Nodes

Figure 4:
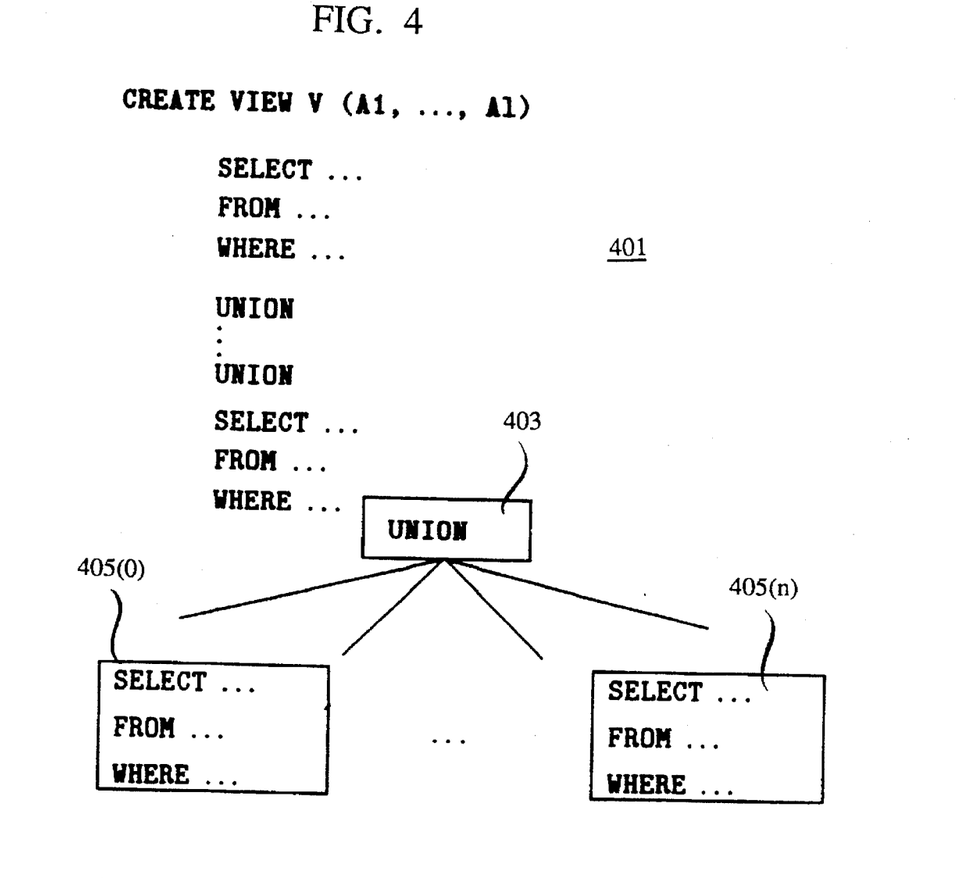
FIG. 4 shows the structure of a UNION or INTERSECTION node.

If a view definition includes UNION (or INTERSECTION), we create a node n 403 for this operation as shown in FIG. 4. Node n has a SELECT child 405(i) for every SELECT block in the view definition. For the $i^{th}$ SELECT child 405, the local attributes are defined as usual and the exported attributes are $V_i.A_1, \ldots, V_i.A_l$, where $V_i$ is a newly created name. The local attributes of (UNION or INTERSECTION) node n 403 are the exported attributes from all its children. The exported attributes of node n 403 are $V.A_1, \ldots, V.A_l$. Note that some of the SELECT blocks of the view definitions may contain GROUPBY blocks, and therefore, some children of n may be triplets 801, as described above.

DAG Queries

If some view V is referenced in two different views (i.e., the node representing V may have more than one parent), the query graph is a directed acyclic graph, or DAG. In that case, the DAG must be converted to a tree by duplicating V (and its children) in the query tree. After completing the two phases of the algorithm, we can combine the two occurrences of V into a common subexpression. However, if the two occurrences end up with two distinct labels, we may not want to combine them, as discussed in Section 5.6.

Example 4.2 FIG. 5 shows query tree 501 for query Q1 107 of FIG. 1 The view ptCustomers 105 is represented on the left by a SELECT node 517 and a GROUPBY node which are combined in the doublet 505. The view fgAccounts 103 is represented on the right by a single SELECT node 507. Query view Q1 10 itself is represented by a single SELECT node 503 at the top. The arcs 519 and 521 from ptCustomers node 505 and fgAccounts node 507 respectively into query node 503 arise from the usage of the views in defining the query. Query tree 501 also shows the labels which have been added to the nodes after completion of the initialization and pullup phases of predicate move-around. The predicates in normal font were added to the labels during initialization (for example, the predicates at 511 in FIG. 5). The predicates in bold font were added to the labels in the pullup phase (for example, the predicates at 509).

5 THE MOVE-AROUND ALGORITHM

We give an overview of the main steps of the predicate move-around algorithm, followed by a detailed description of each step.

5.1 The Main Steps of the Algorithm

1. Label initialization: Initial labels are created from the predicates in the WHERE and HAVING clauses and from functional dependencies. (Initial labels refer only to local attributes.)

2. Predicate pullup: The tree is traversed bottom-up. At each node, we infer predicates on the exported attributes from predicates on the local attributes and push the inferred predicates to the parent node.

3. Predicate pushdown: The tree is traversed top-down. At each node, we infer predicates on the local attributes from predicates on the exported attributes and push the inferred predicates to the children of that node.

4. Label minimization: A predicate can be removed from a node if it is already applied at a descendant of that node.

5. (Optional:) Convert the query tree into SQL code (the plan optimizer may also work directly with the tree representation of the query).

As a result of the above algorithm, the predicates are propagated to every node of the query tree where they can be applied and duplicates are removed so that there are fewer predicates in the tree and those remaining are located at an advantageous position in the query tree for the computation of the query. In a preferred embodiment, the advantageous position is as low in the query tree as possible; however, in other embodiments, other techniques for determining advantageous positions may be applied as well.

The algorithm is extensible in the sense that it can be extended to new types of predicates (e.g., LIKE) and to new types of nodes (e.g., outer-join). Next, we explain each step in detail.

5.2 Label Initialization

SELECT Nodes: The initial label of a SELECT node consists of the predicates appearing in the WHERE clause. For example, in FIG. 5, the first five predicates 523 in fgAccounts node 507 come from the WHERE clause. Note that (NOT secret(c.AC, c.Tel)) is simply a shorthand for the NOT EXISTS subquery.

GROUPBY Triplets: In a node triplet 301 for a GROUPBY block (see FIG. 3), the initial labels of the bottom node 303 and top node 307 are the predicates from the WHERE and HAVING clauses, respectively. The initial label of middle node $n_2$ 305 includes predicates stating that the grouping attributes functionally determine the aggregated values. For example, in the view ptCustomers 105, the predicate $$MaxLen=f\_3(c.AC, c.Tel, c.OwnerName, t.ToAC)$$

appears in GROUPBY node 515.

UNION and INTERSECTION nodes: The initial label of a UNION or an INTERSECTION node n 403 is empty.

Functional Dependencies: Suppose that the following functional dependency holds in a base relation R.

$$fd: \{A_1, \ldots, A_k\} \rightarrow \{B_1, \ldots, B_p\}$$

If a WHERE or a HAVING clause refers to R, then the predicates $f_{fdi}(r.A_1, \ldots, r.A_k) = B_i (1 \leq i \leq p)$ are added to the label created for that clause. For example, the functional dependency $$\{AC, Tel\} \rightarrow \{OwnerName, Type, MemLevel\}$$

holds in customers relation 705; hence, the predicate $$c.Type = f\_1(c.AC, c.Tel)$$

is added to SELECT nodes 507 and 517, since both reference customers relation 705.

Equality Predicates: If, in node n, two exported attributes, $V.A_i$ and $V.A_j$, are aliases of the same local attribute, then add the equality $V.A_i = V.A_j$ to the label of n.

Example 5.1 The initial labels for query tree 501 are shown in typewriter font.

5.3 Predicate Pullup

In the predicate-pullup phase, we traverse the tree bottom up, starting from the leaves. At each node, we infer predicates on the exported attributes from predicates on the local attributes. The inferred predicates are added to the labels of both the given node and its parent. The particular method for inferring additional predicates depends on the type of node under consideration and the types of predicates in the label of that node.

5.3.1 Predicate pullup through SELECT nodes

To pull up predicates through a SELECT node n, having a label L(n), we proceed as follows.

Add to L(n) new predicates that are implied by those already in L(n). For example, if both $r_1.A < r_2.B$ and $r_2.B < r_3.C$ are in L(n), then $r_1.A < r_3.C$ is added to L(n). Ideally, we would like to compute the closure of L(n) under logical implications, since that would maximize the effect of moving predicates around. However, the move-around algorithm remains sound even if we are not able to compute the full closure. Note that when predicates consists only of conjunctions of comparisons (i.e., <, $\leq$, <> and =) among constants and ordinary attributes (i.e., no aggregate terms), then the closure can be computed in polynomial time. See the Ullman reference above.

Infer predicates with exported attributes as follows. If $\alpha$ is in L(n), then add $\tau(\alpha)$ to L(n), where $\tau$ substitutes the exported attributes for the local attributes. For example, in fgAccounts node 507, the predicate fgAccounts.AC="011" on the exported attributes is inferred from the predicate c.AC="011" on the local attributes.

If a predicate in L(n) refers only to exported attributes or constants, then add that predicate to the label of the parent of n. In FIG. 5, for example, the predicate fg.AC="011" is added to the label of the root.

Example 5.2 In FIG. 5, the labels generated by the pullup phase are shown in bold font, for example, at 509. For clarity, the label of the GROUPBY node does not show the predicates pulled up from its child. Also, we do not show all the predicates in the closures of labels.

5.3.2 Predicate pullup through GROUPBY triplets

In principle, it is enough to perform the three steps of the previous section at each node of a GROUPBY triplets (starting with the bottom node). Note that the middle step is redundant in the bottom and middle nodes, since all local attributes in these two nodes are also exported attributes. In practice, however, we need some rules for inferring predicates involving aggregate terms. Following is a (sound but not complete) set of such rules; these rules should be applied to the label, $L(n_2)$, of the middle node (in all these rules, $\leq$ can be replaced with <).

1. If Min(B) is an attribute of $n_2$ (i.e., Min(B) appears in the SELECT clause), then add Min(B)$\leq$B to $L(n_2)$ (in words, the minimum value of B is less than or equal to every value in column B). Furthermore, if $(B \geq c) \in L(n_2)$, where c is a constant, then add Min(B)$\geq$c to $L(n_2)$ (in words, if c is less than or equal to every value in column B, then c is also less than or equal to the minimum value of B).

2. If Max(B) is an attribute of $n_2$, then add Max(B)$\geq$B to $L(n_2)$. Furthermore, if $(B \leq c) \in L(n_2)$, where c is a constant, then add Max(B)$\leq$c to $L(n_2)$. For example, consider GROUPBY node 515 in FIG. 5. First, we infer Max(t.Length)$\geq$t.Length. Since t.Length>2 is pulled up from node 517, we infer Max(t.Length)>2 (by transitivity).

Now, MaxLen>2 is inferred, since MaxLen is an exported attribute that is an alias of Max(t.Length). For clarity, only MaxLen>2 is shown in the figure.

3. Consider the following three predicates: Max(B)$\geq$Min(B), Avg(B)$\geq$Min(B) and Max(B)$\geq$AvE(B). Each of these predicates is added to $L(n_2)$ if its aggregate terms are attributes of $n_2$.

4. If Avg(B) is an attribute of $n_2$ and $(B \leq c) \in L(n_2)$, where c is a constant, then add Avg(B)$\geq$c to $L(n_2)$. If $(B \geq c) \in L(n_2)$, then add $(Avg(B) \geq c)$ to $L(n_2)$.

5.3.3 Predicate pullup through UNION and INTERSECTION nodes

Consider a UNION (or INTERSECTION) node n, as shown in FIG. 4. Recall that the exported attributes of node n are $V.A_1, \ldots, V.A_1$, while the exported attributes of the $i^{th}$ SELECT child are $V_i.A_1, \ldots, V_i.A_1$, where $V_i$ is a newly created name.

Suppose that $\overline{D}_i$ is a conjunction of predicates that have been pulled up into node n from its $i^{th}$ SELECT child, and let $D_i$ be obtained from $\overline{D}_i$ by substituting $V.A_j$ for $V_i.A_j$ ($1 \leq j \leq 1$). If n is a UNION node, we add $D_1 \vee \ldots \vee D_m$ to the labels of both n and its parent. If n is an INTERSECTION node, we add $D_1 \wedge \ldots \wedge D_m$ to the labels of both n and its parent.

5.4 Predicate Pushdown

This phase of the algorithm is a generalization of predicate-pushdown techniques. The combination of pullup and pushdown effectively enables us to move predicates from one part of the tree to other parts. In this phase, we traverse the query tree top down, starting from the root. At each node, we infer new predicates on the local attributes from predicates on the exported attributes and push the inferred predicates down into the children nodes. As earlier, the pushdown process depends on the type of the node. The result of the push-down process in the query tree for FIG. 1 is shown in query tree 601 of FIG. 6.

5.4.1 Predicate pushdown through SELECT nodes

In a SELECT node n, with label L(n), we do as follows.

Infer new predicates over the local attributes as follows. For each predicate $\alpha$ in L(n), add $\tau^{-1}(\alpha)$ to L(n) (if it is not already there), where $\tau^{-1}$ substitutes local variables for the exported variables.

Add to L(n) new predicates that are implied by those already in L(n).

For each child of add to all predicates of having only exported attributes of $n_1$ or constants.

Figure 6:
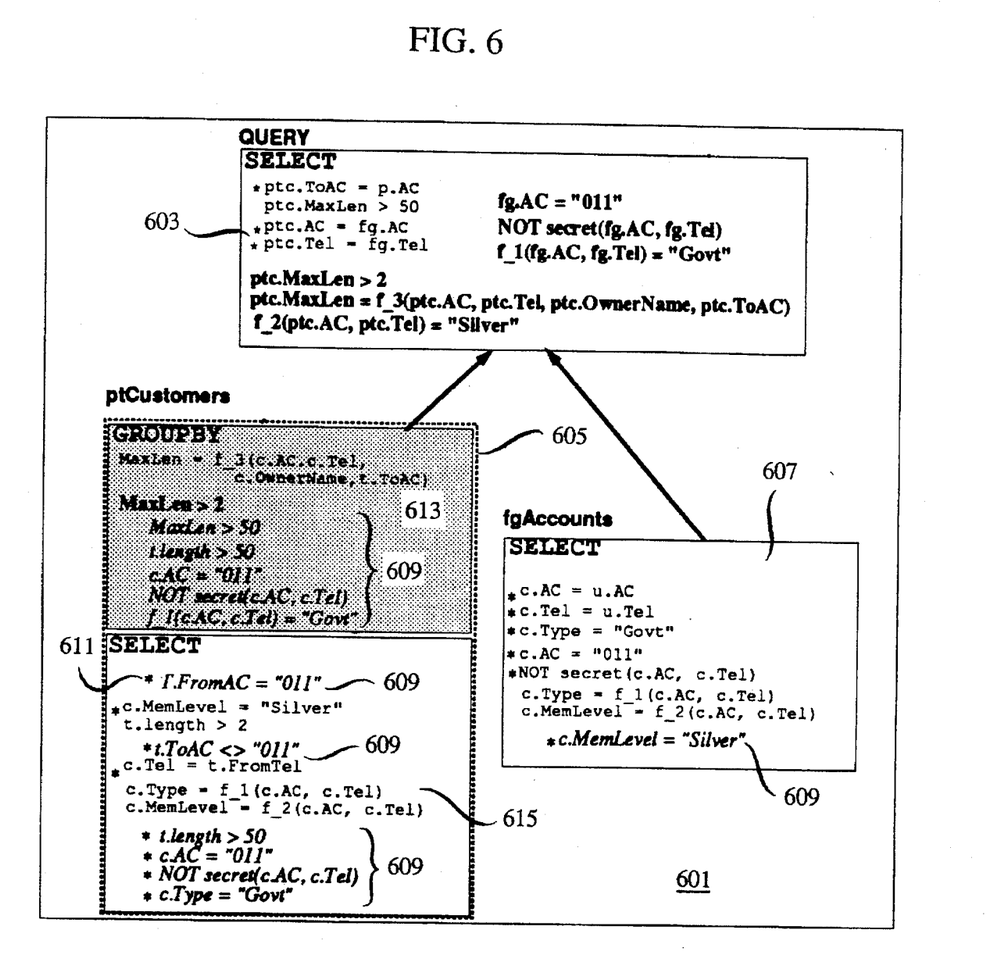
FIG. 6 is the query tree of FIG. 5 after optimization.

Example 5.3 In query tree 601, the predicate ptc.Max-Len>50 is pushed from root node 603 into GROUPBY node

613; predicates added during the pushdown phase are shown in italic in query tree 601. For clarity, we do not show the full closure at each node.

5.4.2 Predicate pushdown through GROUPBY triplets

The three steps set forth for SELECT nodes should also be performed at the nodes of a GROUPBY triplet 301. However, we also need rules for inferring new predicates from predicates with aggregate terms. Following is a set of such rules; the rules should be applied to the label, $L(n_2)$, of middle node 305 (in all these rules, $\leq$ can be replaced with <).

Suppose that $Max(B) \geq c$ is in $L(n_2)$, where c is a constant. If $Max(B)$ is the only aggregate term in $n_2$, then we can add $B \geq c$ to $L(n_2)$. Obviously, looking just at tuples satisfying $B \geq c$ is sufficient for computing $Max(B)$, given that $Max(B)$ should satisfy $Max(B) \geq c$. Generally, however, we cannot look just at tuples satisfying $B \geq c$ in order to compute other aggregates. For that reason we require that $Max(B)$ be the only aggregate term in $n_2$. Consider, for example, GROUPBY node 613 in FIG. 6. The predicate MaxLen>50 is pushed into node 613 from root node 603. By translation into local attributes, we get Max(t.length)>50. Since Max (t.length) is the only aggregate term in GROUPBY node 613, we can infer the predicate t.length>50. Note that by pushing t.length>50 down, we discover that we only need tuples satisfying t.length>50 in view ptCustomers 705, because the maximum of t.length should be greater than 50.

If $Min(B) \leq c$ is in where c is a constant, and $Min(B)$ is the only aggregate term in $n_2$, then we can add $B \leq c$ to $L(n_2)$.

5.4.3 Predicate pushdown through UNION and INTERSECTION nodes

Consider a UNION (or INTERSECTION) node n 403, as shown in FIG. 4. Let denote the substitution of the exported attributes of the $i^{th}$ SELECT child 405 of n 403 for the exported attributes of n; that is, $\tau_i$ substitutes $V_i.A_1, \ldots, V_i.A_l$ for $V.A_1, \ldots, V.A_l$.

The pushdown of predicates from n into its children is done as follows. If $\alpha$ is in $L(n)$ and all attributes in $\alpha$ are exported attributes of n, then add $\tau_i(\alpha)$ to the label of the $i^{th}$ SELECT child 405 of n 403 (note that there is no need to add $\tau_i(\alpha)$ to the label of n, even if it is not there).

Example 5.4 In FIG. 6, the labels generated by the push-down phase of the algorithm are shown in italic font, indicated by 609.

5.5 Label Minimization

At the end of the top-down phase, the same predicates may be repeated in many nodes of the tree. As a result, we can apply predicates earlier than was possible in the original tree. In fact, even an evaluation of the original tree could result in redundant applications of predicates; this may happen, for example, when the original query is formulated using predefined views and the user is oblivious to the exact predicates that are used in those views (and, hence, he may redundantly repeat the same predicates in the query). In the move-around algorithm, redundancies are introduced in two ways.

As a result of translation from local to exported attributes (or vice versa) and the associated pullup (or pushdown), the same predicate appears in some node and in the parent of that node (and, possibly, also in some other ancestors of that node). There is no need, however, to apply a predicate at a node if it has already been applied at a descendant of that node.

Removing redundancies is important for two reasons. First, it saves time, since fewer tests are applied during the evaluation of the query. Secondly, redundant predicates might mislead the plan optimizer due to incorrect selectivity estimates.

Redundancies of the first kind are removed as follows. Suppose that predicate $\alpha$ appears in node n and all attributes of $\alpha$ are local to n, but also have aliases among the exported attributes of n. Then a predicate $\beta$ in the parent of n is redundant if $\beta$ is logically implied by $\tau(\alpha)$, where $\tau$ substitutes the exported attributes of n for the local ones.

Redundancies of the second kind are removed by the known technique of transitive reduction; that is, we repeatedly remove a predicate from a label if it is implied by the rest of the predicates. We get a nonredundant label when no more predicates can be removed.

Finally, we can completely remove labels of GROUPBY, UNION and INTERSECTION nodes. Moreover, predicates containing functional terms (that were generated from functional dependencies and aggregations) are also dropped from all nodes. In FIG. 6, the predicates annotated with a star 611 remain after minimization and form the final labels in our example.

5.6 Translating the Query Tree to SQL

The query tree may be used directly for further rewrite and cost-based optimizations as well as evaluation of the query. In fact, the query tree is similar to the internal representations of queries used by some existing query processors. If desired, however, we can easily translate the query tree back into SQL as follows. SELECT, UNION and INTERSECTION nodes, and GROUPBY triplets are translated into the appropriate SQL statements; the WHERE and HAVING clauses consist of the minimal labels of the corresponding nodes. In our example, the optimized SQL query and views 201 of FIG. 2 are the result of applying the above translation to query tree 601 of FIG. 6.

5.6.1 Translating DAG Queries

When a query tree is created from a DAG query, several subtrees of the tree may correspond to the same view. These subtrees are identical at the beginning of the move-around algorithm, but may become different at the end of the algorithm. Consider two subtree, $T_1$ and $T_2$, generated from the same view V. If, at the end of the algorithm, $T_1$ and $T_2$ are equivalent, then it is sufficient to evaluate just one of $T_1$ and $T_2$. If $T_1$ is contained in $T_2$ (i.e., each label of $T_1$ logically implies the label of the corresponding node of $T_2$), then the view for $T_2$ can be computed from the view for $T_1$ by applying the appropriate selection If neither one is contained in the other, it may still be possible to compute one view from which the two views can be obtained by additional selections.

6 CONCLUSION

The foregoing "Detailed Description" has disclosed to those skilled in the art of optimizing queries how to perform optimizations in which predicates are first propagated in query graphs so that they occupy positions which are advantageous for computing the query and then reduced.

In a preferred embodiment, the predicates are pulled up,i.e. propagated into ancestor nodes of the nodes originally containing the predicates and then pushed down, i.e. propagated into descendent nodes which are different from the nodes which originally contained the predicates. The number of the propagated and unpropagated predicates is then reduced so that there are fewer predicates and each predicate is in a location in the query tree which is advantageous for the computation. One such location is as far down the query graph as possible.

The disclosed techniques may be used in situations where optimization by merging blocks or by means of magic sets transformations are not possible, and may also be combined with these and other query optimization techniques. Portions of the disclosed techniques, including propagating the predicates first up and then down the query graph, moving predicates through aggregation, using functional dependencies to deduce and move predicates, moving EXISTS and NOT EXISTS predicates, and removing redundant predicates, may be employed independently of the predicate move-around techniques.

While the embodiment of the "Detailed Description" employs a relational database accessed by SQL queries, the technique can be used in any system in which a query is applied to data and the query can be parsed to produce a directed acyclic graph. Techniques other than those disclosed herein may be used to move predicates around the query graph and to reduce the predicates. For example, in some cases, it is more efficient to apply a predicate later in the computation, and other embodiments of the invention can incorporate tests for such predicates in their predicate reduction phase. What algorithms are in fact used to move predicates and reduce them may of course depend on the kind of system being optimized.

All of the above being the case, the foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the law.

What is claimed is:

1. A method of operation of a data base system for optimizing a query having predicates applicable to attributes involved in the query, the method comprising the steps of:

making a query graph data structure for the query by creating a label with at least one predicate applicable to the attributes mentioned in at least one node;

in a parent node of the query graph data structure, inferring a first at least one new predicate in the parent node's label from a predicate in a label belonging to any child node of the parent, and propagating the inferred first at least one new predicate to the parent node;

in a child node of the query graph data structure, inferring a second at least one new predicate in the child node's label from a predicate in a label belonging to any parent of the node and propagating the inferred second at least one new predicate to children of the parent node; and generating an optimized query from the query graph data structure by removing from the query graph data structure any redundant predicates.

2. The method set forth in claim 1 further comprising the step of:

reducing the number of the predicates in the query graph data structure.

3. The method set forth in claim 2 wherein:

the step of reducing the number of the predicates reduces the predicates such that no predicate is applied more than once.

4. The method set forth in claim 2 wherein the step of reducing comprises the step of:

removing any predicate from a given node's label which is applied at a descendant of the given node.

5. The method set forth in either claim 2 or claim 4 wherein the step of reducing comprises the step of:

removing any predicate in a label which is implied by another predicate in the label.

6. The method set forth in either claim 1 or claim 2 wherein:

the step of inferring a first at least one new predicate in the parent node's label is repeatedly performed beginning with a child node which is a leaf node and ending when the parent node has no parent; and the step of inferring a second at least one new predicate in the child node's label is repeatedly performed beginning with a parent node which has no parent and ending when the child node is a leaf node.

7. The method set forth in either claim 1 or claim 2 wherein:

each node of the query graph data structure represents a computation in the query;

the predicate used to infer the first at least one new predicate is a predicate on an exported attribute, the exported attribute appearing in the result of the computation represented by the child node; and the predicate used to infer the second at least one new predicate is a predicate on an exported attribute.

8. The method set forth in claim 7 wherein the step of inferring the first at least one new predicate from the predicate on the exported attribute comprises:

applying the predicate on the exported attribute to a local attribute local to the node which corresponds to the exported attribute.

9. The method set forth in claim 7 wherein the step of inferring the second at least one new predicate from the predicate on the exported attribute comprises:

applying the predicate on the exported attribute to a local attribute local to the node which corresponds to the exported attribute.

10. The method set forth in claim 1 or claim 2 wherein:

in the step of inferring a first at least one new predicate, the predicate on the label belonging to the child node includes an aggregation operation.

11. The method set forth in claim 10 wherein the step of inferring a first at least one new predicate comprises the step of:

inferring the first at least one new predicate such that the first at least one new predicate limits the result of the aggregation operation.

12. The method set forth in claim 1 or claim 2 wherein:

in the step of inferring a second at least one new predicate, the predicate on the label belonging to the parent of the node includes an aggregation operation.

13. The method set forth in claim 10 wherein the step of inferring a second at least one new predicate comprises the step of:

inferring the second at least one new predicate such that the second at least one new predicate limits the result of the aggregation operation.

14. The method set forth in claim 1 or claim 2 further comprising the step performed in the parent node of:

adding a third at least one new predicate which is implied by predicates in the label.

15. The method set forth in either claim 1 or claim 2 wherein the step making a query graph data structure further comprises the step of:

inferring a predicate from a function on an attribute of a base relation.

16. The method set forth in claim 1 or claim 2 further comprising the step performed in the child node of:

adding a fourth at least one new predicate which is implied by predicates in the label.

17. The method set forth in either claim 1 or 2 wherein the step of removing the predicates:

reduces the number of predicates to an equivalent smaller number thereof.

* * * * *